Patented Nov. 28, 1939

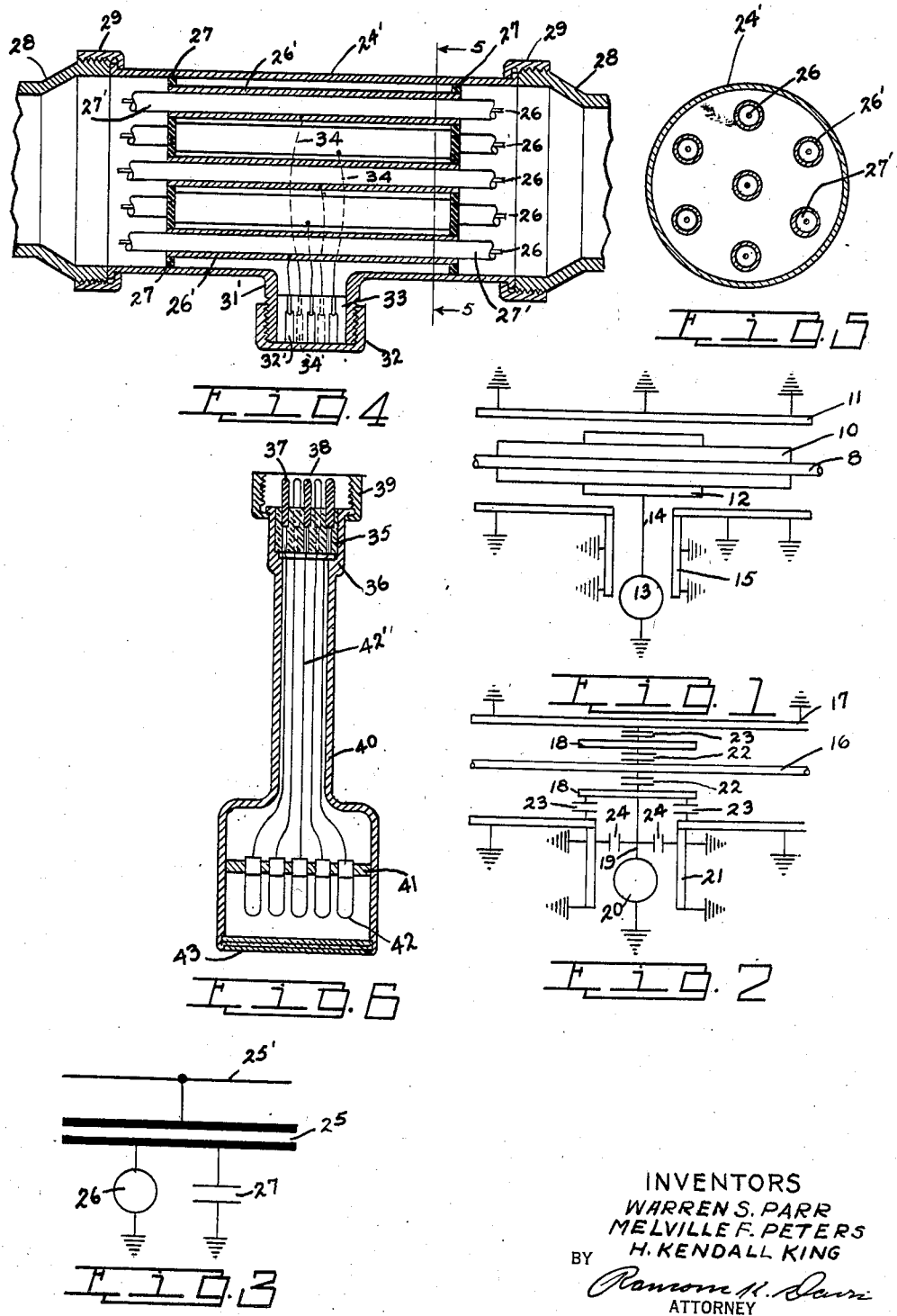

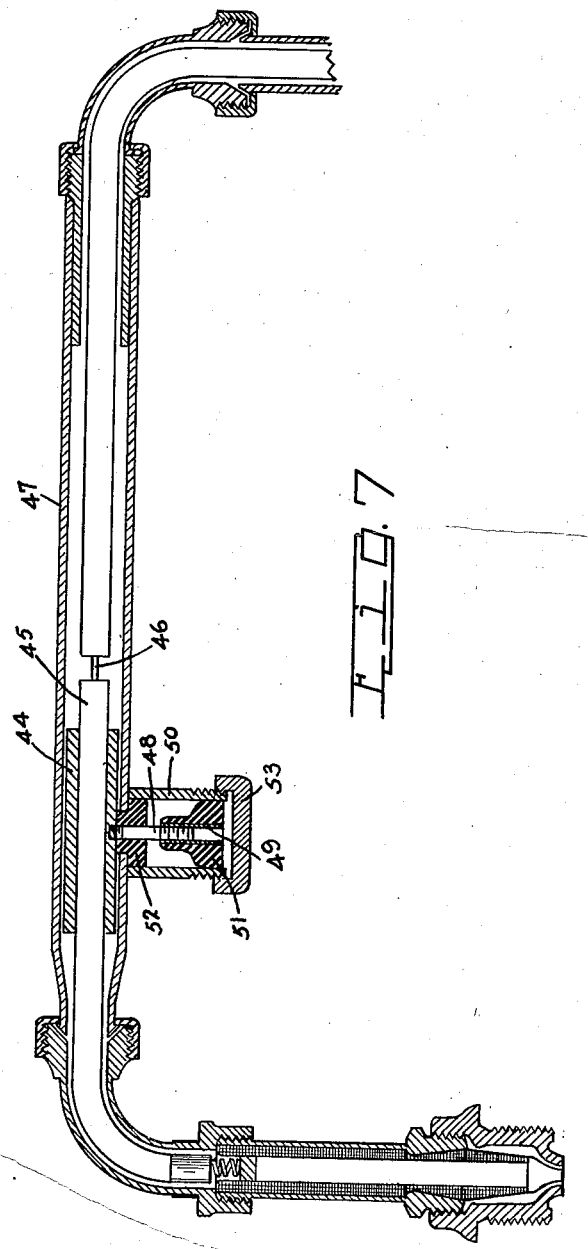

2,181,149

UNITED STATES PATENT OFFICE 2,181,149

SPARK PLUG PERFORMANCE INDICATOR

Melville F. Peters, Beltsville, Md., Warren S. Parr, United States Navy, and Henry K. King, Cabin John, Md.

Application April 25, 1939, Serial No. 269,942

13 Claims. (Cl. 175—183)

(Granted under the act of March 3, 1883, as amended April 30, 1928; 370 O. G. 757)

This invention relates generally to electrical ignition systems of internal combustion engines and particularly to devices for indicating the performance of such systems. More particularly, it relates to devices for indicating the performance of spark plugs of aircraft engine ignition systems which are well shielded to prevent interference with radio reception.

It is well known in the art that if a pick-up voltage, obtained from a high voltage conductor connected to a spark plug of an internal combustion engine, is applied across a sensitive voltage indicating means, such will show whether or not the spark plug is firing properly. It has likewise been shown that such pick-up voltage can be obtained by capacitive coupling to the said high voltage conductor.

But none of the devices shown in the prior art is satisfactory for use in an aircraft equipped with sensitive radio receiving equipment, nor are such prior devices readily adaptable for use in connection with present well-shielded aircraft ignition systems which do permit satisfactory radio reception in the aircraft.

An object of our invention is to provide an improved device for indicating the performance of ignition systems that is adaptable to the well-shielded ignition systems now in use in aircraft.

Another object of our invention is to provide an improved device for indicating ignition performance of aircraft internal combustion engines that is effectively shielded to prevent ignition interference with radio reception.

A further object of our invention is to provide an improved device for indicating fouled or defective spark plugs of aircraft engines in operation that permits effective radio reception in the aircraft in which the engine is installed.

With the above and other objects in view, the invention consists in the construction, combination and arrangement of parts as will be hereinafter more fully described.

Reference is to be had to the accompanying drawings forming a part of this specification in which like reference characters indicate corresponding parts throughout the several views and in which:

Fig. 1 shows schematically our invention applied to a well-shielded ignition conductor of an internal combustion engine;

Fig. 2 shows the device of Fig. 1 with the capacity relations indicated;

Fig. 3 shows the equivalent electrical circuit of all forms of our invention;

Fig. 4 is a longitudinal mid-sectional view showing our invention as applied to a shielded ignition manifold of an internal combustion engine with a socket for plugging in a voltage indicating means;

Fig. 5 is a cross-sectional view of Fig. 4 through 5—5;

Fig. 6 is a mid-sectional view showing the shielded plug-in voltage indicating means, its connectors, and the plug which engages the socket of Fig. 4; and Fig. 7 is a mid-sectional view showing our invention applied to a shielded aircraft engine spark plug with a socket for plugging in a shielded plug connected to a voltage indicating means.

Referring to Fig. 1, an ignition conductor 8 connected to the ungrounded terminal of a spark plug 9 (not shown) is covered with suitable high voltage insulation 10 and is contained within grounded shield 11. A conductive sheath 12 surrounds a portion of conductor 8, is a tight fit around the insulation 10 thereof, and is, of course, also contained within shield 11. Sheath 12 is connected to one terminal of voltage indicating means 13 by conductor 14, the remaining terminal of voltage indicating means 13 being connected to ground. Conductor 14 is led through an opening in shield 11 and is surrounded by a shield 15 which is effectively bonded to shield 11 and is also connected to ground.

In Fig. 2, the elements are the same as in Fig. 1 but the capacities between elements are indicated. In this figure, conductive sheath 18 surrounds a portion of high voltage conductor 16 within grounded shield 17 and is connected, by means of conductor 19, to one terminal of voltage indicating means 20, the remaining terminal of voltage indicating means 20 being grounded. Conductor 19 passes through an opening in shield 17 and is itself surrounded by a grounded shield 21 effectively bonded to shield 17. Capacitors 22 indicate the capacity between conductor 16 and sheath 18. Capacitors 23 indicate the capacity between sheath 18 and shield 17 while capacitors 24 indicate the capacity between conductor 19 and shield 21.

Fig. 3 shows the equivalent electrical circuit of Figs. 1 and 2. Capacitor 25 of this figure represents the aggregate capacity between conductor 16 (Fig. 2) and sheath 18 (Fig. 2), or is the summation of capacitors 22 (Fig. 2). Voltage indicating means 26, connected between one plate of capacitor 25 and ground, is obviously equivalent to the voltage indicating means of Figs. 1 and 2 connected between the conductive sheath and ground. Capacitor 27 represents the capacity between sheath 18 (Fig. 2) and ground plus the capacity between conductor 19 (Fig. 2) and ground; or is the summation of capacitors 23 and 24 of Fig. 2. Conductor 25', shown connected to one plate of capacitor 25, corresponds to high voltage ignition conductors 8 and 16 of Figs. 1 and 2, respectively.

Figs. 4 and 5 illustrate an ignition manifold of an internal combustion engine wherein a grounded cylindrical shield 24' surrounds a plurality of high voltage ignition conductors 26. A conductive sheath 26' is tightly clamped around the insulation 27' of each conductor 26 and sheaths 26' are held rigidly in place in spaced insulating discs 27 which are a tight fit within cylindrical shield 24'. A shielding adapter 28 is clamped to either end of cylindrical shield 24' by means of threaded coupling nut 29. Each adapter 28 is bonded to a grounded shield through which conductors 26 pass in connecting distributor 31 (not shown) to spark plugs 30 (not shown) of the engine. A perpendicular integral cylindrical extension 31', formed in the longitudinal wall of cylindrical shield 24', is externally threaded to receive detachable conductive cap 32. An insulating disc 33 containing a plurality of hollow cylindrical spaced contacts 33' is a tight fit inside cylindrical extension 31' to form a multi-contact socket 34'. A conductor 34 connects each sheath 26' to a separate contact 33'.

Referring to Fig. 6, an insulating disc 35, which fits tightly within a conductive shield 36, contains a plurality of spaced conductive pins 37 and forms a plug 38 which is adapted to engage socket 34' of Fig. 4. An internally threaded nut 39 engages the external threaded portion of cylindrical extension 31' (Fig. 4) when plug 38 engages socket 34' (Fig. 4), with cap 32 (Fig. 4) removed. Shield 36, circular in cross-section, has a reduced diameter portion 40, and, at the opposite end from plug 38, its diameter is enlarged to receive conductive disc 41 which supports a plurality of spaced neon bulbs 42, one for each conductor 26 (Fig. 4). An interior conductor 42' connects each pin 37 to one terminal of a neon bulb 42, the remaining terminal of each bulb 42 being grounded through disc 41 and shield 40. A transparent cover 43 permits visual observation of neon bulbs 42. Shield 36 is shown integral, but it may be made in several parts, with the reduced diameter portion 40 flexible, provided all parts are bonded to each other and effectively grounded.

In Fig. 7, conductive sheath 44 is tightly clamped around the insulation 45 of conductor 46 which is contained within the grounded shield 47 of the shielded aircraft engine spark plug shown. Sheath 44 is threaded to receive perpendicularly extending conductive stud 48, the other end of which engages hollow socket tube 49. A hollow cylindrical shield 50 is bonded to shield 47 and surrounds stud 48. Insulating spacers 51 and 52 hold stud 48 rigidly in place within cylindrical shield 50. A detachable conductive cap 53 engages the outer threaded portion of cylindrical shield 50. When the cap 53 is removed, a plug-in connector to a neon bulb or other voltage indicating means may be plugged in to socket tube 49.

As previously explained, Fig. 3 illustrates the equivalent electrical circuits of Figs. 1 and 2. Figs. 4, 5 and 6, with cap 32 (Fig. 4) removed and plug 38 (Fig. 6) plugged into socket 34' (Fig. 4) illustrate the application of the device to Fig. 1 to a plurality of conductors 26 contained within a shielded ignition manifold, with means for detachably plugging in the voltage indicating means. It is apparent that Fig. 3 also shows the equivalent circuit of any one of the several indicator circuits of Figs. 4, 5 and 6. Fig. 7 shows the device of Fig. 1 applied to a shielded aircraft engine spark plug, with a plug-in feature for the voltage indicating means similar to that of Figs. 4 and 6. Fig. 3 likewise represents the equivalent circuit of Fig. 7, with its voltage indicating means (not shown) plugged in.

Thus, referring to Fig. 3, which is the equivalent circuit of all forms of our device illustrated, when a high voltage is impressed between conductor 25' and ground, as occurs periodically when the particular spark plug to which conductor 25' is connected is energized in accordance with the timing of the engine, this high voltage is impressed across capacitors 25 and 27 in series, and is divided in accordance with the following well-known relations:

$$E_1 C_1 = E_2 C_2$$
$$E = E_1 + E_2$$

where
$C_1$ = the capacity of capacitor 25.
$C_2$ = the capacity of capacitor 27.
$E_1$ = the voltage impressed across capacitor 25.
$E_2$ = the voltage impressed across capacitor 27.
$E$ = the voltage impressed between conductor 25' and ground.

From the above it also follows that:

$$E_2 = \frac{C_1}{C_2} E_1$$

But
$$E_1 = E - E_2$$

Then
$$E_2 = \frac{C_1}{C_2}(E - E_2)$$

Or
$$E_2 = \frac{C_1}{C_1 + C_2} E$$

Since capacitor 27 and voltage indicating means 26 are in parallel, voltage $E_2$ is likewise impressed across voltage indicating means 26.

It is well known in the art that if the spark plug to which conductor 25' is connected is fouled, voltage $E$ will be reduced below that value for normal operation of the engine. Other ignition troubles likewise manifest themselves by reduced voltage $E$, for example, weak or frayed insulation on conductor 25', too small a gap between the sparking electrodes of the spark plug to which conductor 25' is attached, etc., while too great a gap between spark plug electrodes will manifest itself by an increased value of $E$. Since $E_2$, the voltage impressed across the voltage indicating means 27, is directly proportional to $E$, it will change correspondingly, and voltage indicating means 27 will indicate the aforementioned spark plug or ignition troubles by a change of the reading or indication thereon.

The value of
$$\frac{C_1}{C_1 + C_2}$$

which determines the ratio $E_2 : E$, may be varied to suit the particular voltage indicating means it may be desired to employ, by varying the value of $C_1$ and $C_2$. $C_1$ may be varied by changing the length of the sheath surrounding the ignition conductor. A minimum value of $C_2$ is unavoidable, but, if desired, it may be arbitrarily increased by shunting an additional capacitor across the voltage indicating means 26 (Fig. 3). A certain degree of flexibility is thereby obtained which is useful in obtaining the desired value of $E_2$ for a normally functioning spark plug.

It has been determined that ungrounded or incompletely grounded ignition shields, or shields grounded only through a voltage indicating means, such as a neon bulb, do not prevent excessive ignition interference with radio reception in an aircraft. In all present aircraft ignition shielding systems that effectively prevent such ignition interference with radio reception, the shields are complete and well grounded. In some cases it has even been found necessary to ground the shield about every eighteen inches along its length to achieve the object of good radio reception. Thus, it cannot be too strongly stressed that adequate, well-grounded shielding is essential if successful radio communication is to be carried on in an aircraft equipped with an electrical ignition system. It will be noted that all forms of our invention utilize a well-grounded external shield and that our invention is employed only in connection with electrical ignition systems employing grounded external shields.

The detachable plug-in features of the forms of our invention illustrated by Figs. 4, 5, 6 and 7, give certain advantages of flexibility, in that the voltage indicating means may either be continuously installed or may be plugged in only when it is desired to check the spark plugs of a particular engine. If it is desired to utilize a particular type of voltage indicating means that is considered too fragile for continuous use in an operating aircraft, this particular type of voltage indicating means could be kept on the ground and could be detachably plugged in for test purposes. Also, by means of such a plug-in arrangement, a single voltage indicating means would serve for use with a number of engines equipped with the device illustrated by Figs. 4 and 5.

Any reasonably sensitive voltage indicating means can be employed with our invention. Fig. 6 shows the use of neon gas discharge bulbs and such have proved very satisfactory. With this type of voltage indicating means, by varying the capacity of $C_1$ and $C_2$ (Fig. 3), $E_2$ can be made of such a value that for normal operation of the spark plug it will just cause the neon bulb to glow. In such a case, failure of the bulb to glow would indicate a fouled plug (or one of the other ignition troubles aforementioned) and too bright a glow would indicate too great a sparking gap at the sparking electrodes of the spark plug. By varying the values of $C_1$ and $C_2$, a wide range of values of $E_2$ can be obtained as may be required for the particular type of voltage indicating means employed.

Another type of voltage indicating means that has been found especially adaptable for shop and laboratory use is the cathode ray oscillograph. By its use, quantitative measurements of the ignition voltage can be obtained. By means of these measurements, approaching ignition failures can be detected before they actually occur and proper remedial measures taken.

Our invention has been found especially useful when applied to twin ignition systems of double banked air-cooled aircraft engines, in which some of the spark plugs are very difficult of access. In engines of this type one or more fouled or defective plugs will cause a reduction in engine speed but it is very difficult to determine which plug or plugs are defective. The task of removing, testing and examining all of the plugs, twenty-eight in number, of one of these engines is both difficult and time consuming. By the use of our invention such defective plugs can be quickly located, at a considerable saving of both time and labor.

It will be understood that the above description and accompanying drawings comprehend only the general and preferred embodiment of our invention and that various changes in construction, proportion and arrangement of parts may be made within the scope of the appended claims without sacrificing any of the advantages of our invention.

The invention described herein may be manufactured and/or used by or for the Government of the United States of America for governmental purposes without the payment of any royalties thereon or therefor.

We claim:

1. In combination, a high voltage conducting means connected to a spark plug of an internal combustion engine, a grounded voltage indicating means capacitively coupled to said conducting means, and an external grounded shielding means for the above whereby a shunting capacitor to ground is formed across said voltage indicating means.

2. In combination, a high voltage internal conductor of a spark plug of an internal combustion engine, a grounded voltage indicating means capacitively coupled to said conductor, and an external grounded shielding means for the above whereby a shunting capacitor to ground is formed across said voltage indicating means.

3. In combination, a high voltage ignition conductor of an internal combustion engine, a conducting sheath surrounding a portion of said high voltage conductor, an external grounded shielding means for said high voltage conductor and said sheath, a voltage indicating means, a grounding means for said voltage indicating means, a conducting means connecting said sheath to said voltage indicating means, and a grounded shielding means for said conducting means.

4. In combination, a high voltage ignition conductor of an internal combustion engine, a conducting sheath surrounding a portion of said high voltage conductor, an external grounded shielding means for said high voltage conductor and said sheath, a voltage indicating means, a grounding means for said voltage indicating means, a socket means with a detachable plug means therefor, a conducting means connecting said sheath to said voltage indicating means through said socket means and said plug means, and a grounded shielding means for said conducting means.

5. In combination, a high voltage ignition conductor of an internal combustion engine, a conducting sheath surrounding a portion of said high voltage conductor, an external grounded shielding means for said high voltage conductor and said sheath, a voltage indicating means, a grounding means for said voltage indicating means, a conducting means connecting said sheath to said voltage indicating means, and a grounded shielding means for said conducting means whereby said sheath is capacitively coupled to said ignition conductor, and whereby said sheath and said conducting means are capacitively coupled to the respective shielding means therefor.

6. In combination, a high voltage ignition conductor of an internal combustion engine, a conducting sheath surrounding a portion of said high voltage conductor, an external grounded shielding means for said high voltage conductor and said sheath, a voltage indicating means, a grounding means for said voltage indicating means, a socket means with a detachable plug means therefor, a conducting means connecting said sheath to said voltage indicating means through said socket means and said plug means, and a grounded shielding means for said conducting means, whereby said sheath is capacitively coupled to said ignition conductor, and whereby said sheath and said conducting means are capacitively coupled to the respective shielding means therefor.

7. In combination, a high voltage internal conductor of a spark plug of an internal combustion engine, a grounded shielding means for said spark plug, a conductive sheath surrounding a portion of said internal conductor, said sheath being contained within said shielding means for said spark plug, a voltage indicating means, a grounding means for said voltage indicating means, a conducting means connecting said sheath to said voltage indicating means, and a grounded shielding means for said conducting means.

8. In combination, a high voltage internal conductor of a spark plug of an internal combustion engine, a grounded shielding means for said spark plug, a conductive sheath surrounding a portion of said internal conductor, said sheath being contained within said shielding means for said spark plug, a voltage indicating means, a grounding means for said voltage indicating means, a socket means and a detachable plug means therefor, a conducting means connecting said sheath to said voltage indicating means through said socket means and said plug means, and a grounded shielding means for said conducting means.

9. In combination, a high voltage internal conductor of a spark plug of an internal combustion engine, a grounded shielding means for said spark plug, a conductive sheath surrounding a portion of said internal conductor, said sheath being contained within said shielding means for said spark plug, a voltage indicating means, a grounding means for said voltage indicating means, a conducting means connecting said sheath to said voltage indicating means, and a grounded shielding means for said conducting means, whereby said sheath is capacitively coupled to said internal conductor, and whereby said sheath and said conducting means are capacitively coupled to the respective shielding means therefor.

10. In combination, a high voltage internal conductor of a spark plug of an internal combustion engine, a grounded shielding means for said spark plug, a conductive sheath surrounding a portion of said internal conductor, said sheath being contained within said shielding means for said spark plug, a voltage indicating means, a grounding means for said voltage indicating means, a socket means and a detachable plug means therefor, a conducting means connecting said sheath to said voltage indicating means through said socket means and said plug means, and a grounded shielding means for said conducting means, whereby said sheath is capacitively coupled to said internal conductor, and whereby said sheath and said conducting means are capacitively coupled to the respective shielding means therefor.

11. In combination, a plurality of high voltage ignition conductors of an ignition manifold of an internal combustion engine, a grounded external shielding means for said manifold, a conductive sheath surrounding a portion of each said ignition conductor of said manifold, said ignition conductors and said sheaths being contained within said grounded external shielding means, a plurality of voltage indicating means, a grounding means for said voltage indicating means, a conducting means connecting each said sheath to a separate voltage indicating means, and a grounded shielding means for said conducting means.

12. In combination, a plurality of high voltage ignition conductors of an ignition manifold of an internal combustion engine, a grounded external shielding means for said manifold, a conductive sheath surrounding a portion of each said ignition conductor of said manifold, said ignition conductors and said sheaths being contained within said grounded external shielding means, a plurality of voltage indicating means, a grounding means for said voltage indicating means, a socket means and a detachable plug means therefor, a conducting means connecting each said sheath to a separate voltage indicating means through said socket means and said plug means, and a grounded shielding means for said conducting means.

13. In combination, a plurality of high voltage ignition conductors of an ignition manifold of an internal combustion engine, a grounded external shielding means for said manifold, a conductive sheath surrounding a portion of each said ignition conductor of said manifold, said ignition conductors and said sheaths being contained within said grounded external shielding means, a plurality of voltage indicating means, a grounding means for said voltage indicating means, a conducting means connecting each said sheath to a separate voltage indicating means, and a grounded shielding means for said conducting means, whereby each said sheath is capacitively coupled to one said ignition conductor of said manifold, and whereby said sheaths and said conducting means are capacitively coupled to the respective shielding means therefor.

MELVILLE F. PETERS.
WARREN S. PARR.
HENRY K. KING.